(12) United States Patent
Free et al.

(10) Patent No.: US 11,173,634 B2
(45) Date of Patent: Nov. 16, 2021

(54) ELECTROMAGNETIC RADIATION CURABLE PIPE LINER AND METHOD OF MAKING AND INSTALLING THE SAME

(71) Applicant: INA Acquisition Corp., Wilmington, DE (US)

(72) Inventors: Charles Free, Hernando, MS (US); Abu Abraham, St. Louis, MO (US); Yevgeny Zaltsman, St. Louis, MO (US); James Rothe, Ocala, FL (US)

(73) Assignee: INA Acquisition Corp, Wilmington, DE (US)

( * ) Notice: Subject to any disclaimer, the term of this patent is extended or adjusted under 35 U.S.C. 154(b) by 498 days.

(21) Appl. No.: 15/886,588

(22) Filed: Feb. 1, 2018

(65) Prior Publication Data

US 2019/0232532 A1    Aug. 1, 2019

(51) Int. Cl.
*F16L 55/18* (2006.01)
*B29C 35/08* (2006.01)
(Continued)

(52) U.S. Cl.
CPC .......... *B29C 35/0805* (2013.01); *B29C 63/34* (2013.01); *B29C 71/04* (2013.01);
(Continued)

(58) Field of Classification Search
CPC ..... B29C 63/34; B29C 35/0805; B29C 71/04; B32B 7/09; B32B 5/26; B32B 5/0022; B32B 5/02; B32B 1/08; F16L 55/1654
See application file for complete search history.

(56) References Cited

U.S. PATENT DOCUMENTS 3,459,014 A    8/1969  Berning
3,520,749 A    7/1970  Rubenstein
(Continued)

FOREIGN PATENT DOCUMENTS

AU    85333298 A    2/1999
DE    2753669 A1    10/1978
(Continued)

OTHER PUBLICATIONS

Extended European Search Report for European Application No. 19154586.2, dated May 29, 2019, 7 pages, Munich, Germany.
(Continued)

*Primary Examiner* — Daniel McNally
(74) *Attorney, Agent, or Firm* — Stinson LLP (57) ABSTRACT

A liner for being cured by electromagnetic radiation having a wavelength in a curing range. The liner includes an outer portion. The outer portion includes a tube of impermeable material that is opaque to electromagnetic radiation having a wavelength in the curing range. An inner portion includes a tube of felt internally coated with an impermeable coating that is transparent to electromagnetic radiation having a wavelength in the curing range. The inner portion is inside the outer portion. A middle portion includes a tube of impregnable material between the inner and outer portions. Curable polymer that is curable by electromagnetic radiation having a wavelength in the curing range impregnates the felt and the impregnable material. Methods of manufacturing and installing the liner are also disclosed.

15 Claims, 4 Drawing Sheets

(51) Int. Cl.
*B29C 63/34* (2006.01)
*B29C 71/04* (2006.01)
*F16L 55/165* (2006.01)
*B32B 5/02* (2006.01)
*B32B 7/09* (2019.01)
*B32B 5/26* (2006.01)
*B32B 1/08* (2006.01)

(52) U.S. Cl.
CPC ............... *B32B 1/08* (2013.01); *B32B 5/02* (2013.01); *B32B 5/022* (2013.01); *B32B 5/26* (2013.01); *B32B 7/09* (2019.01); *F16L 55/1654* (2013.01); *F16L 55/1656* (2013.01); *F16L 55/18* (2013.01); *B29C 2035/0827* (2013.01); *B32B 2255/02* (2013.01); *B32B 2255/26* (2013.01); *B32B 2307/7265* (2013.01); *B32B 2597/00* (2013.01)

(56) References Cited

U.S. PATENT DOCUMENTS

| | | |
|---|---|---|
| 4,009,063 A | 2/1977 | Wood |
| 4,671,840 A | 6/1987 | Renaud |
| 4,836,715 A | 6/1989 | Wood |
| 4,976,290 A | 12/1990 | Gelin et al. |
| 5,049,003 A | 9/1991 | Barton |
| 5,077,107 A | 12/1991 | Kaneda et al. |
| 5,164,237 A | 11/1992 | Kaneda et al. |
| 5,168,006 A | 12/1992 | Inoguchi et al. |
| 5,186,987 A | 2/1993 | Imoto et al. |
| 5,218,810 A | 6/1993 | Isley, Jr. |
| 5,271,433 A | 12/1993 | Schwert et al. |
| D343,628 S | 1/1994 | Sciholtz |
| 5,322,563 A | 6/1994 | van Bonn et al. |
| 5,334,429 A | 8/1994 | Imoto et al. |
| D358,599 S | 5/1995 | Dietterich et al. |
| 5,423,630 A | 6/1995 | Imoto et al. |
| 5,443,880 A | 8/1995 | Wike |
| 5,501,248 A | 3/1996 | Kiest, Jr. |
| 5,535,786 A | 7/1996 | Mäkelä et al. |
| 5,549,856 A | 8/1996 | Yokoshima |
| 5,593,700 A | 1/1997 | Stilgenbauer |
| 5,597,227 A | 1/1997 | Bergen et al. |
| 5,632,575 A | 5/1997 | Lorenzen et al. |
| 5,634,672 A | 6/1997 | Stack et al. |
| 5,649,398 A | 7/1997 | Isley, Jr. et al. |
| 5,653,555 A | 8/1997 | Catallo |
| 5,683,530 A | 11/1997 | Fawley et al. |
| 5,700,110 A | 12/1997 | Kamiyama et al. |
| 5,703,154 A | 12/1997 | Davis et al. |
| 5,720,575 A | 2/1998 | Henrie |
| 5,758,796 A | 6/1998 | Nishimura et al. |
| 5,769,109 A | 6/1998 | Stanton et al. |
| 5,778,936 A | 7/1998 | McAlpine |
| 5,798,013 A | 8/1998 | Brandenburger |
| 5,799,705 A | 9/1998 | Friedrich et al. |
| 5,836,357 A | 11/1998 | Kittson et al. |
| 5,855,729 A | 1/1999 | Kiest, Jr. et al. |
| 5,868,169 A | 2/1999 | Catallo |
| 5,873,357 A | 2/1999 | Lake |
| 5,873,391 A | 2/1999 | Kittson et al. |
| 5,881,760 A | 3/1999 | Del Zotto |
| 5,911,246 A | 6/1999 | Kittson et al. |
| 5,919,327 A | 7/1999 | Smith |
| 5,931,198 A | 8/1999 | Raji et al. |
| 5,931,199 A | 8/1999 | Kittson et al. |
| 5,937,910 A | 8/1999 | Chandler |
| 5,971,030 A | 10/1999 | Maimets |
| 5,971,440 A | 10/1999 | Boatman |
| 5,975,878 A | 11/1999 | Wood et al. |
| 5,988,702 A | 11/1999 | Sas-Jaworsky |
| 6,019,136 A | 2/2000 | Walsh et al. |
| 6,027,783 A | 2/2000 | Wagener |
| 6,042,668 A | 3/2000 | Kamiyama et al. |
| 6,044,867 A | 4/2000 | Tweedie et al. |
| 6,085,794 A | 7/2000 | Kamiyama et al. |
| 6,085,798 A | 7/2000 | Le Nouveau |
| 6,103,046 A | 8/2000 | Smith |
| 6,146,491 A | 11/2000 | Wood et al. |
| 6,168,846 B1 | 1/2001 | Molyneaux |
| 6,170,531 B1 | 1/2001 | Jung et al. |
| 6,196,271 B1 | 3/2001 | Braun et al. |
| 6,206,993 B1 | 3/2001 | Kiest, Jr. et al. |
| 6,207,002 B1 | 3/2001 | Odell et al. |
| 6,228,312 B1 | 5/2001 | Boyce |
| 6,276,401 B1 | 8/2001 | Wilson |
| 6,296,066 B1 | 10/2001 | Terry et al. |
| 6,296,729 B1 | 10/2001 | Kamiyama et al. |
| 6,349,748 B1 | 2/2002 | Dodds et al. |
| 6,354,434 B1 | 3/2002 | Ellyin et al. |
| 6,360,780 B1 * | 3/2002 | Adolphs ............ F16L 55/1656 138/130 |
| 6,361,080 B1 | 3/2002 | Walsh et al. |
| 6,446,670 B1 | 9/2002 | Woodward et al. |
| 6,488,323 B1 | 12/2002 | Bouligny |
| 6,503,024 B2 | 1/2003 | Rupiper |
| 6,508,276 B2 | 1/2003 | Rädlinger et al. |
| 6,510,781 B2 | 1/2003 | Pecca et al. |
| 6,562,426 B1 | 5/2003 | Kamiyama et al. |
| 6,572,306 B2 | 6/2003 | Prusak |
| 6,578,882 B2 | 6/2003 | Toliver |
| 6,595,069 B2 | 7/2003 | Frey et al. |
| 6,615,875 B2 | 9/2003 | Adolphs et al. |
| 6,634,387 B1 | 10/2003 | Glejbøl |
| 6,641,688 B1 | 11/2003 | Gearhart |
| 6,668,596 B1 | 12/2003 | Wagener |
| 6,679,966 B1 | 1/2004 | Brandenburger |
| 6,681,641 B2 | 1/2004 | Baumoel |
| 6,698,519 B2 | 3/2004 | Nguyen et al. |
| 6,708,729 B1 | 3/2004 | Smith |
| 6,732,763 B2 | 5/2004 | Williamson et al. |
| 6,737,134 B2 | 5/2004 | Friedrich et al. |
| 6,739,355 B2 | 5/2004 | Glejbøl |
| 6,769,484 B2 | 8/2004 | Longmore |
| 6,854,479 B2 | 2/2005 | Harwood |
| 6,863,137 B2 | 3/2005 | Ferry et al. |
| 6,869,667 B2 | 3/2005 | Kawazu et al. |
| 6,889,716 B2 | 5/2005 | Lundberg et al. |
| 6,889,718 B2 | 5/2005 | Glejbøl |
| 6,890,476 B2 | 5/2005 | Wagener et al. |
| 6,923,217 B2 | 8/2005 | Smith |
| 6,923,273 B2 | 8/2005 | Ferry et al. |
| 6,932,116 B2 | 8/2005 | Smith et al. |
| 6,978,806 B2 | 12/2005 | Glejbøl |
| 6,981,526 B2 | 1/2006 | Glejbøl |
| 7,000,645 B2 | 2/2006 | Glejbøl |
| 7,018,691 B2 | 3/2006 | McNeil |
| 7,025,580 B2 | 4/2006 | Heagy et al. |
| 7,069,955 B2 | 7/2006 | Glejbøl |
| 7,096,890 B2 | 8/2006 | Woolstencroft et al. |
| 7,100,632 B2 | 9/2006 | Harwood |
| 7,137,757 B1 | 11/2006 | Cosban |
| 7,153,395 B2 | 12/2006 | Foster et al. |
| 7,172,038 B2 | 2/2007 | Terry et al. |
| 7,178,588 B2 | 2/2007 | Harper et al. |
| 7,220,081 B1 | 5/2007 | Gantt, Jr. |
| 7,231,975 B2 | 6/2007 | Lavaure et al. |
| 7,231,984 B2 | 6/2007 | Jensch |
| 7,241,076 B1 | 7/2007 | Cosban |
| 7,261,788 B1 | 8/2007 | Driver |
| 7,264,695 B2 | 9/2007 | Foster et al. |
| 7,302,973 B2 | 12/2007 | Glejbøl et al. |
| 7,306,011 B2 | 12/2007 | Kiest, Jr. |
| 7,360,797 B2 | 4/2008 | Posson |
| D568,347 S | 5/2008 | Manera et al. |
| 7,472,722 B2 | 1/2009 | Nadarajah et al. |
| 7,478,650 B2 | 1/2009 | Pleydon et al. |
| 7,478,659 B2 | 1/2009 | Jeon |
| 7,494,592 B2 | 2/2009 | Deskins |
| 7,500,494 B2 | 3/2009 | Robinson et al. |
| 7,527,076 B2 | 5/2009 | Lepola et al. |
| 7,621,333 B2 | 11/2009 | Marchal |
| 7,632,408 B1 | 12/2009 | Everson |

(56) References Cited

U.S. PATENT DOCUMENTS

| | | |
|---|---|---|
| 7,637,169 B2 | 12/2009 | Shanahan et al. |
| 7,666,047 B2 | 2/2010 | Suzuki et al. |
| 7,690,092 B2 | 4/2010 | Wagener |
| 7,691,261 B2 | 4/2010 | Deskins |
| 7,708,033 B2 | 5/2010 | Tanaka et al. |
| 7,727,447 B2 | 6/2010 | Song et al. |
| 7,784,552 B2 | 8/2010 | Brouse |
| 7,786,223 B2 | 8/2010 | Mullelr-Frischinger |
| 7,794,813 B2 | 9/2010 | Nguyen et al. |
| 7,858,189 B2 | 12/2010 | Wagener et al. |
| 7,891,381 B2 | 2/2011 | Anders et al. |
| 7,896,032 B2 | 3/2011 | Kiest, Jr. |
| 7,926,578 B2 | 4/2011 | Moffitt et al. |
| 7,938,146 B2 | 5/2011 | Brooks et al. |
| 7,942,167 B1 | 5/2011 | Llewellyn |
| 7,975,726 B2 | 7/2011 | Kiest, Jr. |
| 7,976,920 B2 | 7/2011 | Braad et al. |
| D643,445 S | 8/2011 | Harrison |
| 7,987,875 B2 | 8/2011 | Rytter |
| 7,997,115 B2 | 8/2011 | Tidl et al. |
| D646,700 S | 10/2011 | Takeuchi |
| 8,047,238 B2 | 11/2011 | Wiessner et al. |
| 8,047,396 B2 | 11/2011 | Jenkins et al. |
| 8,069,880 B2 | 12/2011 | Friedrich et al. |
| 8,082,954 B2 | 12/2011 | Rytter |
| 8,110,103 B2 | 2/2012 | Mormino et al. |
| 8,114,057 B2 | 2/2012 | Gerdts et al. |
| 8,119,047 B2 | 2/2012 | Moore et al. |
| D658,689 S | 5/2012 | Li |
| 8,256,089 B2 | 9/2012 | Pionetti |
| 8,272,406 B2 | 9/2012 | McKaigue et al. |
| 8,322,382 B2 | 12/2012 | Slagsvold et al. |
| 8,375,972 B2 | 2/2013 | Kiest, Jr. |
| 8,418,337 B2 | 4/2013 | Salama |
| 8,580,364 B2 | 11/2013 | Quitter |
| 8,590,575 B2 | 11/2013 | D'Hulster |
| D696,317 S | 12/2013 | Carper |
| 8,596,917 B2 | 12/2013 | Emmons et al. |
| 8,609,557 B2 | 12/2013 | Palinsky et al. |
| 8,616,243 B2 | 12/2013 | Kiest, Jr. |
| 8,636,869 B2 | 1/2014 | Wiessner et al. |
| D700,224 S | 2/2014 | Kmoch et al. |
| 8,647,456 B2 | 2/2014 | Wagener et al. |
| 8,678,043 B2 | 3/2014 | Emmons et al. |
| 8,697,215 B2 | 4/2014 | Lahijani |
| 8,739,809 B2 | 6/2014 | Kiest, Jr. |
| 8,740,259 B2 | 6/2014 | Mazzaferro et al. |
| 8,801,329 B2 | 8/2014 | Bateman et al. |
| 8,813,873 B2 | 8/2014 | Beardmore et al. |
| 8,844,577 B2 | 9/2014 | Kiest, Jr. |
| 8,857,860 B2 | 10/2014 | Schwalbach et al. |
| 8,869,839 B1 | 10/2014 | D'Hulster |
| 8,914,954 B2 | 12/2014 | Klethi et al. |
| 8,940,113 B2 | 1/2015 | Lindner et al. |
| 8,978,708 B2 | 3/2015 | Brandenburger et al. |
| 9,004,163 B2 | 4/2015 | Tverlid |
| 9,040,136 B2 | 5/2015 | Procida |
| D733,198 S | 6/2015 | Chappel |
| 9,052,053 B2 | 6/2015 | Kiest |
| 9,074,718 B2 | 7/2015 | Kiest, Jr. |
| 9,074,720 B2 | 7/2015 | D'Hulster |
| 9,163,770 B2 | 10/2015 | Kiest, Jr. et al. |
| 9,188,269 B2 | 11/2015 | Hairston et al. |
| 9,194,513 B2 | 11/2015 | Sierra |
| 9,222,611 B2 | 12/2015 | Colasanto |
| 9,248,605 B2 | 2/2016 | Quitter |
| 9,261,216 B2 | 2/2016 | Stalcup, II et al. |
| 9,261,221 B2 | 2/2016 | Kiest, Jr. |
| 9,267,635 B2 | 2/2016 | Kulkarni et al. |
| 9,278,308 B2 | 3/2016 | Jamtvedt et al. |
| 9,316,339 B1 | 4/2016 | Souza et al. |
| 9,321,210 B2 | 4/2016 | Toliver et al. |
| 9,366,375 B2 | 6/2016 | Kiest, Jr. |
| D764,554 S | 8/2016 | Charles et al. |
| 9,435,468 B2 | 9/2016 | Graham |
| 9,453,597 B2 | 9/2016 | Delaney et al. |
| 9,453,606 B2 | 9/2016 | Catha et al. |
| 9,488,511 B2 | 11/2016 | Barto |
| 9,551,441 B2 | 1/2017 | Dowe et al. |
| 9,579,854 B2 | 2/2017 | Klethy et al. |
| 2001/0010781 A1 | 8/2001 | Prusak |
| 2001/0039875 A1 | 11/2001 | Pecca et al. |
| 2001/0043839 A1 | 11/2001 | Prusak |
| 2001/0046415 A1 | 11/2001 | Rupiper |
| 2002/0004116 A1 | 1/2002 | Friedrich et al. |
| 2002/0007970 A1 | 1/2002 | Terry et al. |
| 2002/0033554 A1 | 3/2002 | Heagy et al. |
| 2002/0036085 A1 | 3/2002 | Bass et al. |
| 2002/0060454 A1 | 5/2002 | Toliver |
| 2002/0124898 A1 | 9/2002 | Renaud et al. |
| 2002/0162733 A1 | 11/2002 | Foster et al. |
| 2003/0034156 A1 | 2/2003 | Gondouin |
| 2003/0047007 A1 | 3/2003 | Baumoel |
| 2003/0066567 A1 | 4/2003 | Manners |
| 2003/0075361 A1 | 4/2003 | Terry et al. |
| 2003/0108682 A1 | 6/2003 | Lehrman et al. |
| 2003/0113489 A1 | 6/2003 | Smith |
| 2003/0121559 A1 | 7/2003 | Glejbøl et al. |
| 2003/0138298 A1 | 7/2003 | Mercier |
| 2003/0141303 A1 | 7/2003 | Grazziotin |
| 2003/0155124 A1 | 8/2003 | Nguyen et al. |
| 2003/0164196 A1 | 9/2003 | Glejbøl et al. |
| 2003/0178201 A1 | 9/2003 | Gleim et al. |
| 2003/0213119 A1 | 11/2003 | Frey et al. |
| 2003/0217777 A1 | 11/2003 | Williamson et al. |
| 2003/0234057 A1 | 12/2003 | Woolstencroft et al. |
| 2004/0035471 A1 | 2/2004 | Harwood |
| 2004/0040703 A1 | 3/2004 | Longmore |
| 2004/0050442 A1 | 3/2004 | Glejbøl et al. |
| 2004/0079524 A1 | 4/2004 | Bass et al. |
| 2004/0089358 A1 | 5/2004 | Burd et al. |
| 2004/0094209 A1 | 5/2004 | Harwood |
| 2004/0118468 A1 | 6/2004 | Mestemacher |
| 2004/0129373 A1 | 7/2004 | Nadarajah et al. |
| 2004/0134767 A1 | 7/2004 | Foster et al. |
| 2004/0144440 A1 | 7/2004 | Lundberg et al. |
| 2004/0144530 A1 | 7/2004 | Bass et al. |
| 2004/0149341 A1 | 8/2004 | Driver |
| 2004/0168960 A1 | 9/2004 | Holtzapple et al. |
| 2004/0171136 A1 | 9/2004 | Holtzapple et al. |
| 2004/0182462 A1 | 9/2004 | Glejbøl et al. |
| 2004/0194838 A1 | 10/2004 | Glejbøl et al. |
| 2004/0194967 A1 | 10/2004 | Jaensch |
| 2004/0221907 A1 | 11/2004 | Glejbøl |
| 2004/0247810 A1 | 12/2004 | McNeil |
| 2004/0258479 A1 | 12/2004 | Manners |
| 2004/0258837 A1 | 12/2004 | Robinson |
| 2004/0261998 A1 | 12/2004 | Lavaure et al. |
| 2005/0028880 A1 | 2/2005 | Smith |
| 2005/0028881 A1* | 2/2005 | Smith ............... F16L 55/1651 138/98 |
| 2005/0051344 A1 | 3/2005 | Goss |
| 2005/0115741 A1 | 6/2005 | Terry et al. |
| 2005/0161100 A1* | 7/2005 | Pleydon .................. B32B 7/12 138/98 |
| 2005/0173919 A1 | 8/2005 | Posson |
| 2005/0183785 A1 | 8/2005 | Lundberg et al. |
| 2005/0247448 A1 | 11/2005 | Harper et al. |
| 2005/0257846 A1 | 11/2005 | Nordling, Jr. |
| 2005/0281970 A1 | 12/2005 | LaMarca, II et al. |
| 2006/0006124 A1 | 1/2006 | Deskins |
| 2006/0048833 A1 | 3/2006 | Glejbøl et al. |
| 2006/0090804 A1 | 5/2006 | Driver et al. |
| 2006/0118028 A1 | 6/2006 | Schroeder |
| 2006/0124188 A1 | 6/2006 | Catha et al. |
| 2006/0137757 A1 | 6/2006 | McKeen et al. |
| 2006/0151042 A1 | 7/2006 | Stringfellow et al. |
| 2006/0175053 A1 | 8/2006 | Marchal |
| 2006/0185750 A1 | 8/2006 | Mestemacher |
| 2006/0219311 A1 | 10/2006 | Kiest, Jr. |
| 2007/0018448 A1 | 1/2007 | Nadarajah et al. |
| 2007/0029688 A1 | 2/2007 | Delaney et al. |
| 2007/0036925 A1 | 2/2007 | Braad |
| 2007/0074774 A1 | 4/2007 | Chandler |

(56) References Cited

U.S. PATENT DOCUMENTS

| | | |
|---|---|---|
| 2007/0114689 A1 | 5/2007 | Driver et al. |
| 2007/0119512 A1 | 5/2007 | Rytter |
| 2007/0144784 A1 | 6/2007 | Head et al. |
| 2007/0163665 A1 | 7/2007 | Lepola et al. |
| 2007/0172616 A1 | 7/2007 | Ehsani et al. |
| 2007/0180610 A1 | 8/2007 | Mohr et al. |
| 2007/0267785 A1 | 11/2007 | Bellamy et al. |
| 2008/0017263 A1 | 1/2008 | Robinson et al. |
| 2008/0053554 A1 | 3/2008 | Salama |
| 2008/0060699 A1 | 3/2008 | Mestemacher |
| 2008/0078463 A1 | 4/2008 | Kiest |
| 2008/0121359 A1 | 5/2008 | Holtzapple et al. |
| 2008/0145579 A1 | 6/2008 | Nguyen et al. |
| 2008/0173396 A1 | 7/2008 | Wiessner |
| 2008/0217063 A1 | 9/2008 | Moore et al. |
| 2008/0277012 A1 | 11/2008 | Anders et al. |
| 2008/0277013 A1 | 11/2008 | Anders et al. |
| 2008/0283138 A1 | 11/2008 | Rytter |
| 2009/0036582 A1 | 2/2009 | Muller-Frischinger |
| 2009/0056823 A1 | 3/2009 | Kiest, Jr. |
| 2009/0090508 A1 | 4/2009 | Brouse |
| 2009/0101345 A1 | 4/2009 | Moffitt et al. |
| 2009/0116927 A1 | 5/2009 | Keenan et al. |
| 2009/0127180 A1 | 5/2009 | Deskins |
| 2009/0129853 A1 | 5/2009 | Pionetti |
| 2009/0165927 A1 | 7/2009 | Driver et al. |
| 2009/0166273 A1 | 7/2009 | Mormino et al. |
| 2009/0188327 A1 | 7/2009 | Shanahan et al. |
| 2009/0205733 A1 | 8/2009 | Stringfellow et al. |
| 2009/0250134 A1 | 10/2009 | Slagsvold et al. |
| 2009/0250135 A1 | 10/2009 | Friedrich et al. |
| 2009/0308475 A1 | 12/2009 | Stringfellow et al. |
| 2009/0314409 A1 | 12/2009 | Ehsani |
| 2010/0038019 A1 | 2/2010 | Da Silveira et al. |
| 2010/0062202 A1 | 3/2010 | Procida |
| 2010/0075078 A1* | 3/2010 | Quitter .................... B32B 1/08 428/35.2 |
| 2010/0078118 A1 | 4/2010 | Ehsani |
| 2010/0181325 A1 | 7/2010 | Jenkins et al. |
| 2010/0212803 A1 | 8/2010 | Carr et al. |
| 2010/0243154 A1 | 9/2010 | Wiessner et al. |
| 2010/0291903 A1 | 11/2010 | McPherson |
| 2010/0295198 A1 | 11/2010 | Kiest, Jr. |
| 2010/0300760 A1 | 12/2010 | Beardmore et al. |
| 2011/0030830 A1 | 2/2011 | McKaigue et al. |
| 2011/0052325 A1 | 3/2011 | Bateman et al. |
| 2011/0074147 A1 | 3/2011 | Thomas et al. |
| 2011/0083766 A1 | 4/2011 | Anders |
| 2011/0101686 A1 | 5/2011 | Dalmolen et al. |
| 2011/0135899 A1 | 6/2011 | Meltzer et al. |
| 2011/0236138 A1 | 9/2011 | Cosban |
| 2011/0244125 A1 | 10/2011 | Weisenberg et al. |
| 2011/0247755 A1 | 10/2011 | Sanders |
| 2011/0259461 A1 | 10/2011 | Kiest, Jr. |
| 2011/0277864 A1 | 11/2011 | Kiest, Jr. |
| 2011/0277868 A1 | 11/2011 | Emmons et al. |
| 2011/0280665 A1 | 11/2011 | Emmons et al. |
| 2012/0000563 A1 | 1/2012 | Lahijani |
| 2012/0006439 A1 | 1/2012 | Kiest, Jr. |
| 2012/0007714 A1 | 1/2012 | Mühlin |
| 2012/0012217 A1 | 1/2012 | Hairston et al. |
| 2012/0018080 A1 | 1/2012 | Wiessner et al. |
| 2012/0048455 A1 | 3/2012 | Rocher et al. |
| 2012/0056414 A1 | 3/2012 | Thomas et al. |
| 2012/0090721 A1 | 4/2012 | Toliver et al. |
| 2012/0111578 A1 | 5/2012 | Tverlid |
| 2012/0145271 A1 | 6/2012 | McKeller et al. |
| 2012/0175004 A1 | 7/2012 | Kiest, Jr. |
| 2012/0193908 A1 | 8/2012 | Mazzaferro et al. |
| 2012/0199233 A1 | 8/2012 | Mizell et al. |
| 2012/0211114 A1 | 8/2012 | Nilsson et al. |
| 2012/0248766 A1 | 10/2012 | Schwalbach et al. |
| 2012/0261015 A1 | 10/2012 | Warren |
| 2012/0261016 A1 | 10/2012 | Fuechtjohann et al. |
| 2012/0280488 A1 | 11/2012 | Pionetti |
| 2012/0285575 A1 | 11/2012 | Catha et al. |
| 2013/0019982 A1 | 1/2013 | Kobayashi |
| 2013/0019983 A1 | 1/2013 | Kiest, Jr. |
| 2013/0033033 A1 | 2/2013 | Eck |
| 2013/0061971 A1 | 3/2013 | Chamberland |
| 2013/0074972 A1 | 3/2013 | Fuechtjohann et al. |
| 2013/0081732 A1 | 4/2013 | Kiest, Jr. |
| 2013/0112303 A1 | 5/2013 | Kiest, Jr. |
| 2013/0126034 A1 | 5/2013 | Sierra |
| 2013/0133775 A1 | 5/2013 | Duncan et al. |
| 2013/0213513 A1 | 8/2013 | Kiest, Jr. |
| 2013/0220465 A1 | 8/2013 | D'Hulster |
| 2013/0263443 A1 | 10/2013 | Delaney et al. |
| 2013/0280477 A1 | 10/2013 | Davis et al. |
| 2014/0027000 A1 | 1/2014 | Kiest, Jr. |
| 2014/0034175 A1 | 2/2014 | Fyfe |
| 2014/0050464 A1 | 2/2014 | Lin |
| 2014/0076447 A1 | 3/2014 | Kiest, Jr. |
| 2014/0085643 A1 | 3/2014 | Kiest, Jr. |
| 2014/0116557 A1 | 5/2014 | Bichler |
| 2014/0116566 A1 | 5/2014 | Bader et al. |
| 2014/0209128 A1 | 7/2014 | Abdul-Ali |
| 2014/0238525 A1 | 8/2014 | Dyksterhouse |
| 2014/0251480 A1 | 9/2014 | Kulkarni et al. |
| 2014/0261832 A1 | 9/2014 | Kiest, Jr. et al. |
| 2014/0261972 A1 | 9/2014 | Colasanto |
| 2014/0262267 A1 | 9/2014 | Fustos et al. |
| 2014/0284914 A1 | 9/2014 | Tsambarlis |
| 2014/0290782 A1 | 10/2014 | Dowe et al. |
| 2014/0326511 A1 | 11/2014 | Beardmore et al. |
| 2014/0352955 A1 | 12/2014 | Tubel et al. |
| 2014/0356074 A1 | 12/2014 | Bureau et al. |
| 2014/0360611 A1 | 12/2014 | Kiest, Jr. |
| 2014/0373631 A1 | 12/2014 | Davis et al. |
| 2015/0020908 A1 | 1/2015 | Warren |
| 2015/0045527 A1 | 2/2015 | Schleicher et al. |
| 2015/0107713 A1 | 4/2015 | Manners |
| 2015/0144480 A1 | 5/2015 | Zhao et al. |
| 2015/0151484 A1 | 6/2015 | Sanders |
| 2015/0211342 A1 | 7/2015 | Shaw et al. |
| 2015/0246501 A1 | 9/2015 | Den Besten et al. |
| 2015/0252929 A1 | 9/2015 | Jaspaert |
| 2015/0330536 A1 | 11/2015 | Jaspaert |
| 2015/0330550 A1 | 11/2015 | Hairston et al. |
| 2015/0369399 A1 | 12/2015 | Fyfe |
| 2016/0010785 A1 | 1/2016 | Arnold et al. |
| 2016/0018027 A1 | 1/2016 | Douglass, III et al. |
| 2016/0033072 A1 | 2/2016 | Mersmann et al. |
| 2016/0053922 A1 | 2/2016 | Ehsani |
| 2016/0078743 A1 | 3/2016 | Tanner |
| 2016/0091352 A1 | 3/2016 | Barto |
| 2016/0146380 A1 | 5/2016 | Anelli et al. |
| 2016/0178108 A1 | 6/2016 | Ehsani |
| 2016/0186897 A1 | 6/2016 | Stalcup, II et al. |
| 2016/0223122 A1 | 8/2016 | Kiest, Jr. |
| 2016/0245429 A1 | 8/2016 | Zhu et al. |
| 2016/0258567 A1 | 9/2016 | Hairston et al. |
| 2016/0334046 A1 | 11/2016 | Kiest |
| 2016/0348828 A1 | 12/2016 | Mathey et al. |
| 2016/0363389 A1 | 12/2016 | Hemker et al. |
| 2017/0043606 A1 | 2/2017 | Meltzer et al. |
| 2017/0227159 A1* | 8/2017 | Reichel .................... F16L 9/14 |

FOREIGN PATENT DOCUMENTS

| | | |
|---|---|---|
| DE | 4326503 A1 | 2/1995 |
| DE | 4403370 A1 | 8/1995 |
| DE | 19941669 A1 | 3/2001 |
| EP | 0228998 A1 | 7/1987 |
| EP | 0510784 A1 | 10/1992 |
| EP | 2390547 A2 | 11/2001 |
| EP | 2273171 A1 | 1/2011 |
| EP | 2722157 A1 | 4/2014 |
| JP | H02219635 | 9/1990 |
| JP | H0350280 A | 3/1991 |
| JP | H03292127 A | 12/1991 |
| JP | S5262379 | 5/1997 |
| JP | 2007518608 A | 7/2007 |
| KR | 20060012367 | 2/2006 |

(56) References Cited

FOREIGN PATENT DOCUMENTS

| WO | WO9114896 | A1 | 10/1991 |
| WO | WO1993015131 | A2 | 8/1993 |
| WO | WO9919659 | A1 | 4/1999 |
| WO | WO0017557 | A1 | 3/2000 |
| WO | WO2005047755 | A1 | 5/2005 |
| WO | WO2005047756 | A1 | 5/2005 |
| WO | WO2005047757 | A1 | 5/2005 |
| WO | WO2006111580 | A1 | 10/2006 |
| WO | WO2012082949 | A1 | 6/2012 |
| WO | 2012145422 | A1 | 10/2012 |
| WO | 2013163736 | A1 | 5/2013 |
| WO | 2014110544 | A1 | 7/2014 |

OTHER PUBLICATIONS

Trenchless Technology, CIPP of Leaking High-Pressure Gas main, Oct. 2011, 4 pages.

Trenchless Technology, Trenchless Lateral Repair Keeps Oregon Landscape Untouched, Apr. 2012, 2 pages.

VECTORPLY(R) Performance Composite Reinforcements, product sheet E-LTM 3610, VECTORPLY(R) Corporation, Rev. May 3, 2011.

VECTORPLY(R) Performance Composite Reinforcements, product sheet E-TLX 2400, VECTORSPORTS(TM), VECTORPLY(R) Corporation, Rev. May 3, 2011.

VECTORPLY(R) Performance Composite Reinforcements, product sheet E-BX 1200, VECTORPLY(R) Corporation, Rev. May 3, 2011.

VECTORPLY(R) Performance Composite Reinforcements, product sheet E-QX 4800, LABORSAVER(TM), VECTORPLY(R) Corporation, Rev. May 3, 2011.

VECTORPLY(R) Performance Composite Reinforcements, product sheet E-LM 3610, LABORSAVER(TM), VECTORPLY(R) Corporation, Rev. May 3, 2011.

VECTORPLY(R) Performance Composite Reinforcements, product sheet E-TLX 2200, VECTORSPORTS(TM), VECTORPLY(R) Corporation, Rev. May 3, 2011.

VECTORPLY(R) Performance Composite Reinforcements, product sheet E-BXM 1708, VECTORPLY(R) Corporation, Rev. May 3, 2011.

VECTORPLY(R) Performance Composite Reinforcements, product sheet E-BX 1700, VECTORPLY(R) Corporation, Rev. May 3, 2011.

VECTORPLY(R) Performance Composite Reinforcements, product sheet E-QXCFM 3510, VECTORFUSION(TM) Infusion Specific Reinforcements, VECTORPLY(R) Corporation, Rev. May 3, 2011.

VECTORPLY(R) Performance Composite Reinforcements, product sheet E-BXCFM 1710, VECTORFUSION(TM), Infusion-Specific Reinforcements, VECTORPLY(R) Corporation, Rev. May 3, 2011.

Rongxing Zhou, An Improved MWK Structure for Composite Reinforcement, Textile Research Journal, Published by Sage, Apr. 1, 2005.

FYFE(R) an Aegion Company, Tyfo(R) Fibrwrap(R) Composite Systems, 3 pages, Copyright 2013 Fyfe Co., LLC (admitted prior art).

Oxnera, Keith B and Allsup, Todd; Advances in Cured-in-Place Pipe Rehabilitation for Pressurized Piping Systems, © 1999 Insituform Technologies, Inc., 12 pages.

Heavens, John W.; The Trenchless Renovation of Potable Water Pipelines, Insituform Technologies, Inc., Chesterfield, Missouri, 12 pages—admitted prior art.

BKP Berolina Polyester GmbH Co. KG Technical Data, Sep. 5, 2003, pp. 1-101.

BKP Berolina Polyester GmbH Co. KG Technical Data, Sep. 5, 2003, pp. 102-202.

\* cited by examiner

ELECTROMAGNETIC RADIATION CURABLE PIPE LINER AND METHOD OF MAKING AND INSTALLING THE SAME

FIELD

This disclosure generally relates to a cured-in-place pipe (CIPP) liner configured for being cured by electromagnetic radiation such as ultraviolet (UV) light.

BACKGROUND

Over time or because of a particular event or condition (e.g., seismic activity, exposure to excessive or uneven loads or moments, poor compaction, crown corrosion, corrosive soil, etc.), the structural integrity or capacity of force mains, other pipes, and like structures may diminish. For example, such items may crack, corrode, deteriorate, and the like. Such damage to a pipe is particularly problematic when the pipe is used to carry a high pressure fluid because the pressurized fluid can impart significant forces, particularly in the hoop direction, on the pipe. Different methods of repairing or otherwise strengthening damaged pipes and other items are known. For example, fabric liners can be attached to one or more portions of a pipe interior. In CIPP lining applications, such liners are impregnated in a curable resin or epoxy, attached to the interior surface of a host pipe, and allowed to cure, thereby forming a watertight barrier between the host pipe and the pipe interior.

Some CIPP liners are configured to be cured by electromagnetic radiation in certain wavelength ranges. For example, CIPP liners can be configured for being cured by UV light by impregnating a resin-impregnable material received between two impermeable tubes with resin that is configured to be cured by UV light. These liners are conventionally installed by being positioned inside a host pipe and cured by moving a UV light source through the interior of the liner. The inner impermeable tube is oftentimes formed by a separate bladder that is removed after the liner is cured.

SUMMARY

In one aspect, a liner is configured for being cured in place in a pipe using electromagnetic radiation having a wavelength in a curing range. The liner has a first end and a second end spaced apart along a length of the liner. The liner comprises an outer portion having an interior and a length extending from the first end to the second end of the liner. The outer portion comprises a fluid-impermeable material formed into a tube extending along the length of the outer portion. The fluid impermeable material is opaque to electromagnetic radiation having a wavelength in the curing range. A middle portion is located in the interior of the outer portion and has an interior and a length extending from the first end to the second end of the liner. The middle portion comprises an impregnable material formed into a tube extending along the length of the middle portion. An inner portion is located in the interior of the middle portion and has an interior and a length extending from the first end to the second end of the liner. The inner portion comprises coated felt formed into a tube extending along the length of the inner portion. The coated felt comprises felt and a fluid-impermeable coating on the felt that defines the interior of the inner portion. The coating is transparent to electromagnetic radiation having a wavelength in the curing range.

In another aspect, a method of manufacturing a liner for lining a pipe that is curable by electromagnetic radiation in a curing range comprises forming a tube of coated felt comprising felt and a polymer coating on the felt that is fluid impermeable and transparent to electromagnetic radiation having a wavelength in the curing range such that the polymer coating defines an interior of the tube of coated felt. A tube of impregnable material is formed around the tube of coated felt. A tube of fluid-impermeable material that is opaque to electromagnetic radiation having a wavelength in the curing range is formed around the tube of impregnable material.

In still another aspect, a method of repairing a host pipe comprises positioning a liner inside the host pipe. The liner comprises an outer portion comprising a tube of impermeable material that is opaque to electromagnetic radiation having a wavelength in a curing range, an inner portion inside the outer portion comprising a tube of felt internally coated with an impermeable coating that is transparent to electromagnetic radiation having a wavelength in the curing range, a middle portion located between the outer portion and the inner portion and comprising a tube of impregnable material, and curable polymer that is configured to be cured by electromagnetic radiation having a wavelength in the curing range impregnating the felt and the impregnable material. Electromagnetic radiation having a wavelength in the curing range is directed outward from a location inside the liner through the impermeable coating to cure the curable polymer whereby the curable polymer cures to form a cured polymer that extends continuously from the impermeable coating to the outer portion through the felt and the impregnable material.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
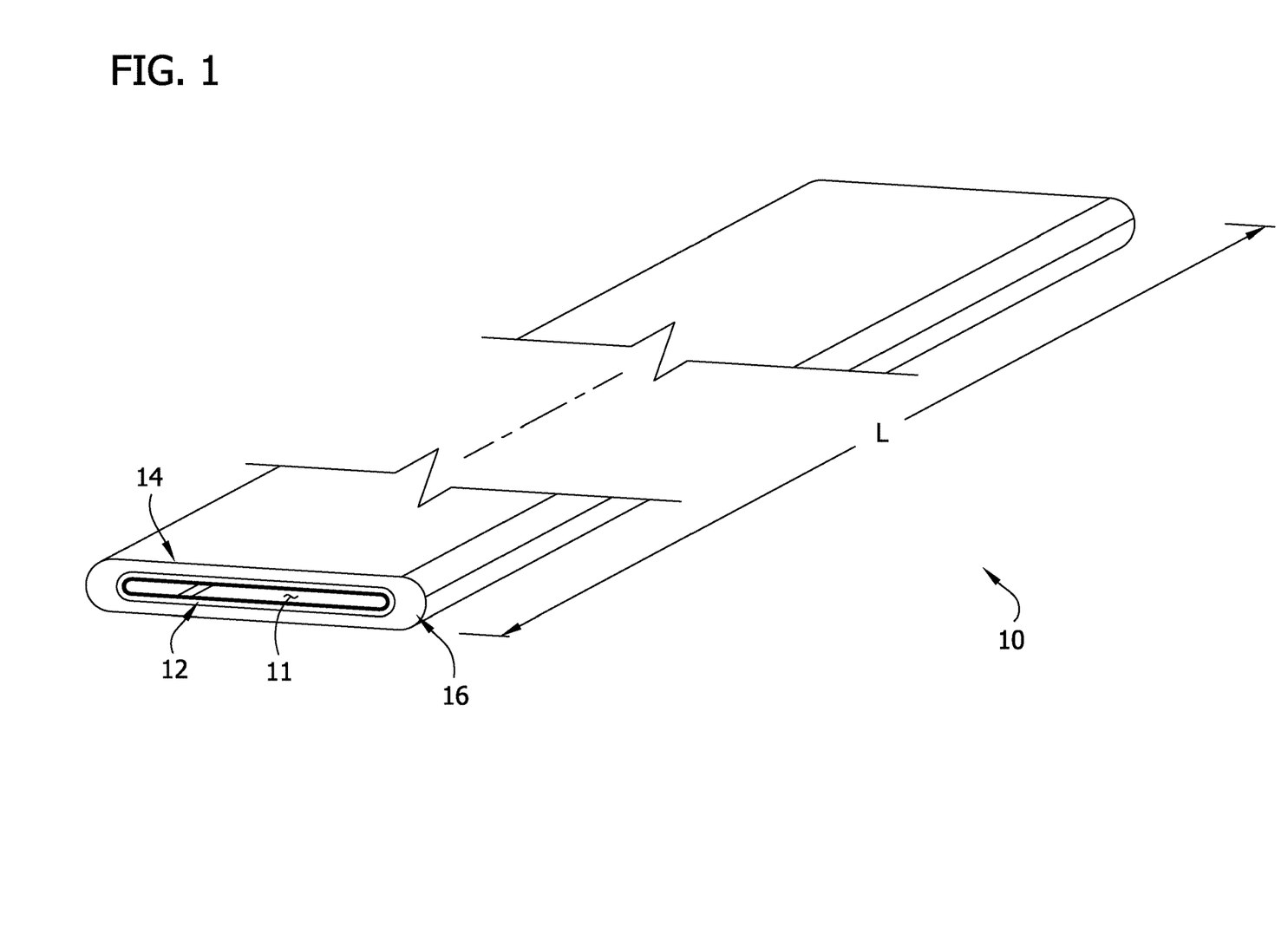
FIG. 1 is a fragmentary perspective of a liner.

Referring to FIG. 1, one embodiment of a liner for being cured in place inside a host pipe (not shown) is generally indicated at reference number 10. The liner 10 is configured to be cured by electromagnetic radiation having a wavelength in a curing range. In the illustrated embodiment the curing range includes at least a portion of the UV light spectrum (e.g., electromagnetic radiation having a wavelength in a range of from about 10 nm to about 400 nm). Other liners can be configured to be cured by electromagnetic radiation having a wavelength in another curing range without departing from the scope of the invention. The liner 10 has a first end and a second end spaced apart along a length L of the liner. The liner 10 defines an interior passage 11 extending along the length L from the first end portion through the second end portion of the liner. The liner 10 comprises an inner portion, an outer portion, and a middle portion, generally indicated at reference numbers 12, 14, and 16, respectively. UV light-curable resin (broadly, an a curable polymer configured to be cured by electromagnetic radiation having a wavelength in a curing range) is encapsulated between an impermeable inner layer defined by the inner portion 12 and an impermeable outer layer defined by the outer portion 14. The liner 10 may be pulled or otherwise positioned within the host pipe that is need of repair or refurbishment, and expanded into engagement with an inner surface of the host pipe. As explained below, liner 10 is cured by directing UV light radially outward from a light source in the interior passage 11, and the liner is configured so that the light passes through the inner portion 12 and the middle portion 16 to cure the resin encapsulated in the liner. As will be explained in further detail below, the liner portions 12, 14, 16 are configured to form a fluid-tight and circumferentially reinforced CIPP liner inside the host pipe after the resin has cured.

Figure 2:
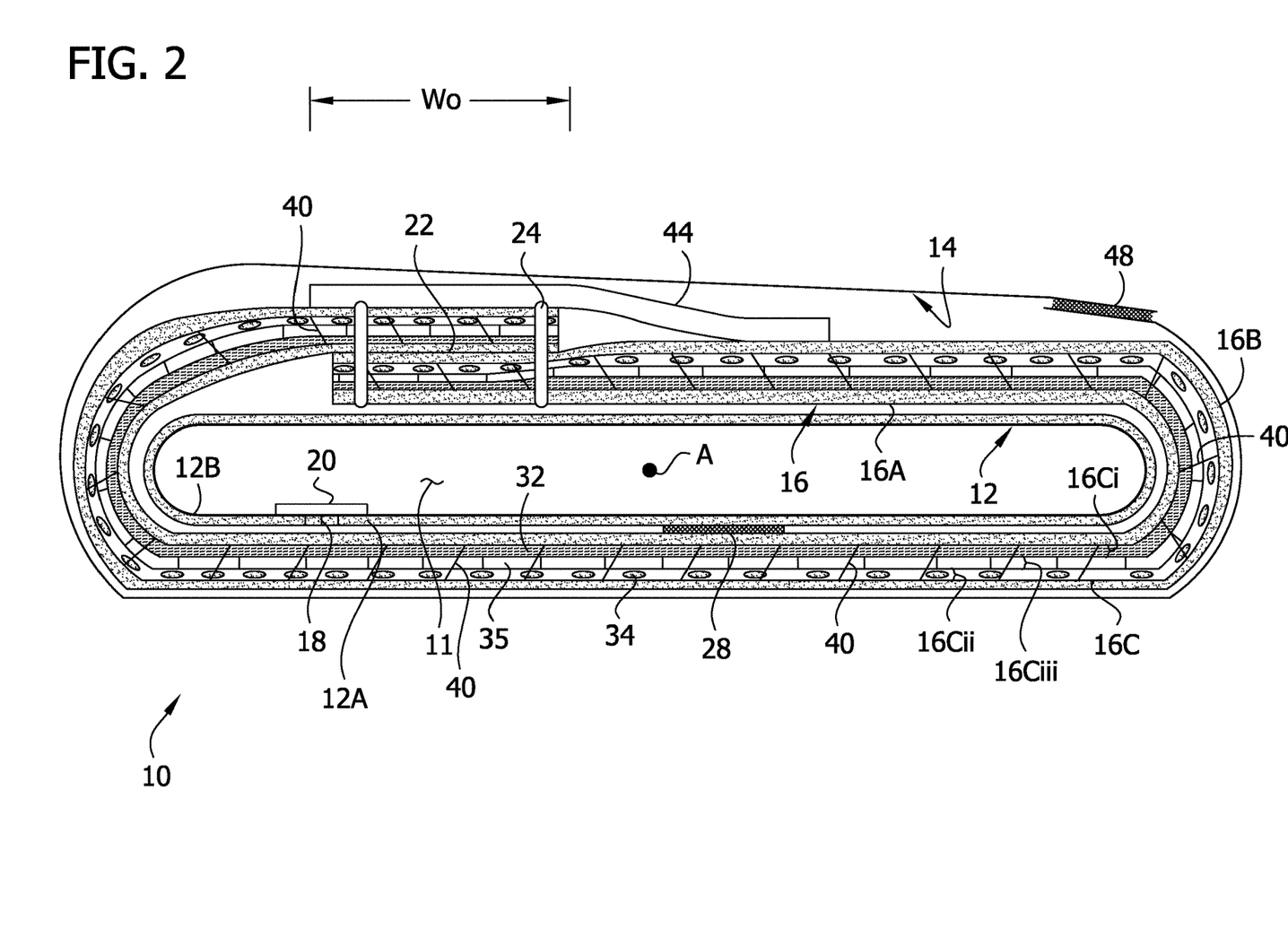
FIG. 2 is a schematic cross section of the liner.

Referring to FIG. 2, the inner portion 12 has a length that extends from the first end to the second end of the liner 10 and comprises a coated felt that is formed into a tube that extends along the length of the inner portion. The inner portion 12 comprises an outer layer of felt 12A (e.g., non-woven threads that are needle-punched, matted, condensed, or otherwise pressed together) and a fluid-impermeable coating 12B along the felt that defines the interior passage 11 of the liner 10. The coating 12B can be formed by a polymer that is applied to the felt 12A in fluidic form and then cured to permanently bonded to the felt. Alternatively, the coating 12B can be formed from an impermeable polymer film that is permanently bonded to the felt 12A using an adhesive, heat, etc. such that there is a bond between the coating and the felt that is substantially continuous along substantially the entire surface area of the felt. The felt 12A comprises a resin-impregnable material such as polyester felt. The impermeable coating 12B can comprise a polymer, for example a polyolefin, such as polyethylene or polypropylene; a vinyl polymer, such as polyvinylchloride; or a polyurethane. The impermeable coating 12B is transparent to UV light (or other electromagnetic radiation having a wavelength in another curing range). Suitably, the coated felt that forms the inner portion 12 is configured to stretch circumferentially when the liner 10 is expanded radially from a first diameter to a larger second diameter. Moreover, the coating 12B on the inner portion 12 is preferably airtight so that the liner can be expanded by fluid pressure applied to the interior passage into engagement with the host pipe inner wall. A bladder (not shown) is not required. Exemplary methods of forming a coated felt inner portion 12 are described in U.S. Pat. Nos. 7,857,932, 7,261,788, and 7,238,251, each of which is hereby incorporated by reference in its entirety.

The inner portion 12 is formed from one or more sheets of coated felt having first and second end margins spaced apart along a length that extends along a length of the inner portion and first and second side margins spaced apart along the width that extends about a circumference of the inner portion. When the inner portion 12 is formed from more than one sheet of coated felt, the sheets are arranged end-to-end and joined together along their end margins. The sheet(s) are folded into a tube configuration in which the side margins engage one another, the impermeable coating 12B defines the interior of the tube, and the felt 12A defines the exterior of the tube. The side margins are joined together at a seam 18 (e.g., a butt seam, an overlap seam, etc.) by joining structure such as stitching, an adhesive bond, a flame bond, etc. In the illustrated embodiment, the seam 17 extends lengthwise of the inner portion 12. A fluid-impermeable tape 20 is applied to the interior surface of the tube 12 along the length of the seam 18. The tape 20 can be heat-boned or chemically bonded to the interior surface of the tube 12 in certain embodiments. The tape 20 seals the seam 18 so that the inner portion 12 provides a fluid-impermeable barrier about the perimeter of the interior passage 11. When the liner 10 expands radially during installation, the coated felt stretches circumferentially while the seam 18 remains intact and sealed by the tape 20.

The middle portion 16 has a length extending from the first end to the second end of the liner 10 and comprises a multilayer material formed into a tube that extends along the length of the middle portion. The middle portion 16 defines an interior that extends along the length of the middle portion. The inner portion 12 is received in the interior of the middle portion 16. As will be discussed in further detail below, the middle portion 16 is formed from an inner impregnation layer 16A formed from resin-impregnable material, an outer impregnation layer 16B formed from resin-impregnable material, and a strength layer 16C that includes strengthening fibers received between the inner and outer impregnation layers. In other embodiments, the middle portion can comprise other multilayer materials (e.g., a single impregnation layer and one or more strength layers; two or more strength layers and impregnation layers; etc.) or a single-layer material. Although the illustrated liner 10 includes one middle portion 16 received between the inner and outer portions 12, 14, other embodiments can include a plurality of middle portions in a concentric arrangement between the inner and outer portions. For example, additional middle portions can be used to increase the thickness and/or hoop strength of the installed liner 10.

The middle portion 16 is formed from one or more sheets of a multilayer composite fabric having first and second end margins spaced apart along a length that extends along a length of the middle portion and first and second side margins spaced apart along a width that extends about a circumference of the middle portion. When the middle portion 16 is formed from more than one sheet of composite fabric, the sheets are arranged end-to-end and joined together along their end margins. To form the middle portion 16, the sheet(s) are folded into a tube configuration in which the side margins engage one another, the inner impregnation layer 16A defines the interior of the tube, the outer impregnation layer 16B defines the exterior of the tube, and each of the layers 16A, 16B, 16C extends along the length of the middle portion. As described in further detail below, the side margins are joined together at a seam 22 that is circumferentially offset from the seam 18 of the inner portion 12.

In one or more embodiments, each of the impregnation layers 16A, 16B is formed from a resin-impregnable felt, e.g., a polyester felt, which extends continuously along the length and about the circumference of the middle portion 16. In the illustrated embodiment, the non-woven fibers of the felt layers 16A, 16B are needled to the strength layer 16C to secure the strength layer between the felt layers. Needling the felt layers 16A, 16B to the strength layer 16C enables the composite fabric to be handled as a unitary sheet of material during manufacturing. The felt layers 16A, 16B provide good resin-impregnation characteristics and also provide structure that is suitable for being handled by industrial sewing machines when forming the composite fabric into the tube 16. An exemplary material for the felt layers 16A, 16B is polyester felt. Such felts are used by Aegion Corporation of St. Louis, Mo., in various cured-in-place pipe lining products such as, for example, InsituMain® pipe liners. Other types of felts or other resin-impregnable materials can be used to form the impregnation layer(s) of the middle portion without departing from the scope of the invention. In the illustrated embodiment, the inner felt layer 16A is bonded to the felt 12A of the inner portion 12 along a bonding line 28 that extends along the length L of the liner 10. For example, the inner felt layer 16A can be flame-bonded or adhered to the felt 12A along the bonding line 28 in certain embodiments.

Suitably, the strength layer 16 comprises strengthening fibers, such as glass fibers, carbon fibers, etc. The strength layer 16C extends continuously along the length and about the circumference of the middle portion 16. In the illustrated embodiment, the strength layer 16C is formed from an inner sublayer 16Ci, an outer sublayer 16Cii, and a middle sublayer 16Ciii, and each of the sublayers extends along the length and about the circumference of the middle portion 16. In the illustrated embodiment, the inner sublayer 16Ci is formed from randomly oriented chopped fibers 32 distributed throughout the strength layer 16C. The outer sublayer 16Cii is formed from continuous fibers 34 oriented generally parallel to one another lengthwise of the liner 10 and distributed throughout the strength layer 16C, and the middle sublayer 16Ciii is formed from long oriented chop material containing long fibers 35 oriented generally parallel to one another and transverse to the continuous fibers and distributed throughout the strength layer. The different types of fibers 32, 34, 35 are illustrated schematically in FIG. 2. It will be understood that the strength layers can have other configurations in other embodiments The chopped fibers 32 are matted together in random orientations to form the inner sublayer 16Ci of the strength layer 16C. The random oriented chopped fibers 32 are loosely held together in a mat such that they can shift relative to one another and allow the inner sublayer 16Ci to stretch circumferentially as the liner 10 expands radially. The random oriented fibers 32 are configured to enhance the strength of the strength layer 16 in a non-directional manner (e.g., the random oriented fibers strengthen the liner 10 in a circumferential direction and also in other directions). Moreover, as described in further detail below, the mat of random oriented fibers 32 provides a backing structure to which the bundles of fibers 34, 35 are secured to form the strength layer 16. Securing the bundles of fibers 34, 35 to the sublayer of randomly oriented fibers 32 allows sheet material including the three sublayers 16Ci, 16Cii, 16Ciii of strengthening fibers to be handled independently during manufacturing before it is needled or otherwise secured to one or both of the felt layers 16A, 16B.

In the illustrated embodiment the continuous fibers 34 are arranged in bundles that extend continuously along the length of each sheet of composite fabric that is used to form the middle portion 16. The bundles of continuous fibers 34 are spaced about the circumference of the middle portion 16 to form the outer sublayer 16Cii. The bundles of continuous longitudinal fibers 34 can move circumferentially of the middle portion 16 so that the outer sublayer 16Cii can stretch circumferentially when the liner 10 expands radially. The illustrated continuous fibers 34 form a one-bundle-thick sublayer 16Cii of fibers, but in other embodiments the bundles of continuous fibers can be stacked to form a sublayer of chopped fibers that is more than one bundle in thickness. The continuous fibers 34 provide longitudinal reinforcement of the liner material 10. As is known in the art, longitudinal reinforcement can enable a liner to withstand the large frictional forces that are imparted on a liner when it is pulled into a host pipe. In one or more embodiments, the continuous fibers 34 are oriented generally perpendicular (broadly, transverse) to the long fibers 35.

The fibers 35 if the long oriented chop material in the middle layer 16Ciii extend circumferentially of the liner 10 (e.g., in the hoop direction of the liner). More specifically, the fibers 35 are arranged in bundles that extend circumferentially of the strength layer 16C to circumferentially reinforce the liner 10. Moreover, because the bundles are formed from long fibers 35 instead of continuous fibers, the middle portion 16C can stretch circumferentially when the liner 10 expands radially. Each fiber 35 has a length that long in comparison to random oriented fibers 32, but is smaller than the circumference of the middle portion 16. Each bundle of long fibers 35 extends about the entire circumference of the middle portion. The fibers 35 can all have the same length or have different lengths without departing from the scope of the invention. The bundles of long oriented chop fibers 35 are spaced apart from one another along the length of the middle portion 16 to form the middle sublayer 16Ciii of the strength layer 16C. The illustrated long fibers 35 form a one-bundle-thick sublayer 16Ciii of fibers, but in other embodiments the bundles of chopped fibers can be stacked to form a sublayer that is more than one bundle in thickness. In still other embodiments, the circumferentially oriented chopped fibers can be supported in the strength layer without being arranged in bundles.

The bundled fibers 35 are held loosely in the strength layer 16C so that they can move relative to one another within each bundle in directions parallel to their lengths along the circumference of the middle portion 16. Since the long fibers 35 can move relative to one another along their lengths, the middle sublayer 16Ciii of the strength layer 16C can be stretched circumferentially when the liner 10 expands radially. Since the felt layers 16A, 16B and inner and outer sublayers 16Ci, 16Cii of the strength layer 16C are also formed from circumferentially stretchable material as explained above, the middle portion 16 is configured to stretch circumferentially as the diameter of the liner 10 increases when it is expanded during installation.

In the illustrated embodiment stitching 40 loosely secures the bundled long fibers 35 and bundled continuous fibers 34 to the mat of random oriented fibers 32 to form the strength layer 16C. But in other embodiments, other ways of loosely securing the strengthening fibers can be used without departing from the scope of the invention. The stitching 40 is sufficiently loose to permit the fibers 35 within each circumferential bundle to move relative to one another along the circumference of the strength layer 16C and is sufficiently strong to maintain the bundled arrangement of the fibers during installation. The stitching 40 is also configured to allow the random oriented fibers 32 to shift and the bundles of continuous fibers 34 to move circumferentially of the liner during installation. Thus, the stitching 40 is configured to maintain the general arrangement of the strengthening fibers 32, 34, 36 during installation while permitting the strengthening fibers to move as required to facilitate circumferential stretching of the strength layer 16C when the liner 10 is radially expanded.

In the illustrated embodiment, the composite fabric forming the middle portion is folded so that the side margins of the fabric sheet(s) overlap one another at the seam 22. The seam thus comprises an overlap portion that extends generally along the length L. In the illustrated embodiment, overlap stitching 24 secures the overlapping side margins of the composite material together. In other embodiments, the overlapped side margins could be secured together by a heat bond, an adhesive bond, etc. The overlap portion 22 has a width Wo. In certain embodiments the width Wo is in an inclusive range of from about 1.5 inches (3.8 cm) to about 2.5 inches (6.35 cm). Widths in this range can be suitable for using an industrial sewing machine to stitch the overlap portion 22. However, it will be understood that overlap portions of other widths can be used in other embodiments. The stitching 24 allows the tube to expand circumferentially without breaking the seam 22. Because the impregnation layers 16A, 16B and strength layer 16C are configured to stretch circumferentially, when the middle portion 16 expands from a first diameter to a larger second diameter during installation, the width Wo of the longitudinal overlap portion 22 does not decrease. Instead the width Wo of the longitudinal overlap portion 22 either stays the same or increases, increasing proportionally with the increase in circumference of the middle portion 16. The stitching 24 maintains a strong seam even after the diameter of the tube 16 increases.

In one or more embodiments, the overlap portion 22 is reinforced with a reinforcing strip 44. The reinforcing strip 44 can comprise any suitable reinforcing material, but in certain embodiments the reinforcing strip is a two-layer material comprising a felt layer and a fibrous layer that is needle punched or otherwise secured to the felt layer. In one embodiment, the reinforcing strip 44 is attached to the outer felt layer 16B at locations on opposite sides of the seam 22, e.g., by flame bonds, adhesive bonds, stitching, etc. The reinforcing strip 44 can extend continuously along the length of the middle portion 16 and/or be attached to the outer layer 16B of the middle portion on opposite sides of the seam 22 continuously along, or at spaced apart locations along, the length of middle portion.

The outer portion 14 has a length extending from the first end to the second end of the liner 10 and comprises an impermeable film or foil that extends circumferentially about the middle portion 16, the inner portion 12, and the interior 11 along the length of the outer portion. The outer portion 14 defines an interior that extends along the length of the outer portion. The middle portion 16 is located in the interior of the outer portion 14. Suitably, the outer portion 16 is opaque to UV light (or other electromagnetic radiation having a wavelength in the curing range of the resin of the liner 10).

The outer portion 14 is formed from one or more sheets of impermeable film having first and second end margins spaced apart along a length extending along the length of the outer portion and first and second side margins spaced apart along a width that extends about a circumference of the outer portion. When the outer portion 14 is formed from more than one sheet of impermeable film, the sheets are arranged end-to-end and joined together along their end margins. The sheet(s) are folded into a tube shape such that the side margins engage one another and are joined together at a seam 48. In the illustrated embodiment, the side margins are overlapped and joined together by a band seal at the seam 48. But in other embodiments, the side margins can be joined together in other ways without departing from the scope of the invention. Suitably, the seam 48 is fluid-impermeable and configured to withstand circumferential stretching of the outer portion 14 as the liner 10 expands radially during installation. In one or more embodiments, the seam 48 is offset circumferentially from the seams 18, 22 of the inner and middle portions 12, 16.

As explained above, UV-curable resin is encapsulated between the outer portion 14 and the impermeable inner coating 12B of the inner portion 12. The resin impregnates the middle portion 16 (e.g., the felt layers 16A, 16B and the strength layer 16C) and the felt 12A of the inner portion 12. The ends of the liner 10 are suitably sealed to prevent the resin from flowing out of the ends of the liner. For example, in one or more embodiments, at each end of the liner 10, the film that forms the outer portion 14 is folded over the ends of the middle portion 16 and the inner portion 12 and bonded to the inner impermeable coating 12B to form an end seal. (In FIG. 1, the end seal of the visible end of the liner 10 is not shown to illustrate the tubes 12, 14, 16). End seals can also be formed in other ways in other embodiments.

In an exemplary method of manufacturing the liner 10, the manufacturer folds a sheet of coated felt into a tube 12 so that the side margins engage one another and the coating 12B defines the interior of the tube. The manufacturer guides the coated felt tube 12 through a stitching machine to stitch the side margins of the material at the seam 18. The manufacturer then applies impermeable tape 20 along the seam 18 to seal the seam. After forming the inner portion 12, the manufacturer wraps one or more sheets of composite strengthening fabric around the inner portion to form one or more middle portions 16. The manufacturer wraps each sheet of strengthening fabric so that the side margins overlap one another at an overlap seam 22 that is circumferentially spaced from the seam 18. The manufacturer then guides the middle portion 16 through a stitching machine to join the overlapped side margins by stitching 24. The reinforcing strip 44 is then placed over the seam 22 and flame bonded to the outer felt layer 16B. Each middle portion 16 is also flame bonded to the tube that is received in its interior. For example, in the illustrated embodiment, the manufacturer flame bonds the middle portion 16 to the inner portion 12 at flame bond 28 that extends along the length L of the liner 10. After the desired number of middle portion(s) 16 is/are formed and flame bonded to the inner liner 12, the manufacturer wraps UV-opaque impermeable film around the middle portion(s) to form the outer portion 14 and band seals the side margins together to form a fluid-impermeable seam 48.

Before sealing the ends of the liner 10, the manufacturer delivers UV-curable resin between the inner portion 12 and the outer portion 14 to impregnate the middle portion 16 and the felt 12A with the resin. For example, in one embodiment, the manufacturer injects a plurality of slugs of resin at circumferentially spaced apart locations into a space located between the felt 12A of the inner portion 12 and the inner impregnation layer 16A of the middle portion 16. As is known in the art, the manufacturer can inject the resin while a vacuum is drawn through the liner 10 and can guide the liner 10 through rollers to distribute the resin through the resin-impermeable components of the liner (e.g., through each of the felt 12A, the felt layers 16A, 16B and the strength layer 16C along the length and about the circumference of the liner 10). After delivering the resin, the end portions of the liner 10 can be sealed, for example, by folding end portions of the outer portion 14 around the ends of the middle portion 16 and inner portion 12 and bonding them to the inner coating 12B. After sealing the ends of the liner 10, the liner can be held at the manufacturing facility or elsewhere (e.g., at a location remote from the host pipe) in an enclosure that limits exposure to UV light until the liner is needed for being installed in a host pipe.

The illustrated liner 10 is suitable for being installed in a host pipe using various pull-in installation techniques. Suitable pull-in techniques are described in U.S. Pat. No. 7,112,254, which is hereby incorporated by reference in its entirety. In general, to install the liner 10, the liner is first transported to the site of the host pipe. The liner 10 is impregnated with resin at the manufacturing site, and thus no onsite wet-out equipment is required. The installer attaches a pull-in fitting (not shown) to one end of the liner 10 and connects a pull line. In certain embodiments, the pull-in fitting seals the interior passage 11 at the end of the liner 10 to which it is attached. The pull line extends from the pull-in fitting through the host pipe to an access point, where it is connected to a winch or other pulling device. The winch winds the pull line to pull the liner 10 into the host pipe. Either before the liner 10 is pulled into the host pipe, after the liner is pulled into the host pipe, or at a time in between, an inflation canister (not shown) is attached to the end of the liner opposite the pull-in fitting. In certain embodiments, before installing the inflation canister, a curing device including a drive system and a UV light source is placed in the interior passage. The inflation canister includes a compressed air fitting and, like the pull-in fitting, seals the interior passage 11 at the end of the liner 10 to which it is attached.

When the liner 10 is pulled to the desired position in the host pipe, compressed air or other inflation fluid is introduced into the interior passage 11 through the inflation canister. The compressed air causes the liner 10 to expand radially. As the liner 10 expands, the inner, outer, and middle portions 12, 14, 16 all stretch circumferentially until the outer portion engages the host pipe about the circumference of the liner along substantially the entire length of the liner. With compressed air pressing the liner 10 against the host pipe, the curing device is driven through the interior passage along the length of the liner while directing UV light radially outward toward the liner. The UV light passes through the UV-transparent coating 12B and cures the resin impregnating the felt 12A. The UV light also cures the resin impregnating the felt layers 16A, 16B and strength layer 16C of the middle portion 16. Once cured, the resin forms a cured polymer that extends continuously from the impermeable coating 12B to the outer impermeable film 14, through the felt 12 and each layer 16A, 16B, 16C of the middle portion 16. The cured polymer matrix strongly binds the middle portion 16 to the felt 12A to prevent inner portion 12 from separating from the middle portion after the installed liner 10 is put into service. Furthermore, the impermeable coating 12B and the outer film 14 provide fluid-impermeable barriers along the host pipe, and the strength layer 16C (in particular, the circumferentially oriented fibers 35) circumferentially reinforces the host pipe to withstand internal loads (e.g., internal fluid pressures, etc.) and/or external loads (e.g., seismic loads, etc.).

As can be seen therefore, the liner 10 provides a UV-curable CIPP liner that can be installed by being pulled into place and inflated without onsite resin impregnation equipment. The coated felt inner portion 12 allows the liner to be inflated without using a removable bladder and also permanently secures the internal fluid-impermeable coating 12B in the installed liner 10 with a continuous polymer matrix that connects the felt 12A to the middle portion 16. Each of the tubes 12, 14, 16 of the liner 10 are stretchable so that wrinkles are not formed in the liner during installation. After being installed, the liner 10 provides a watertight passage and load-bearing and/or pressure-bearing capacity that can, in certain embodiments, meet the requirements of the host pipe application without any structural contribution from the host pipe in which the liner is installed.

Figure 3:
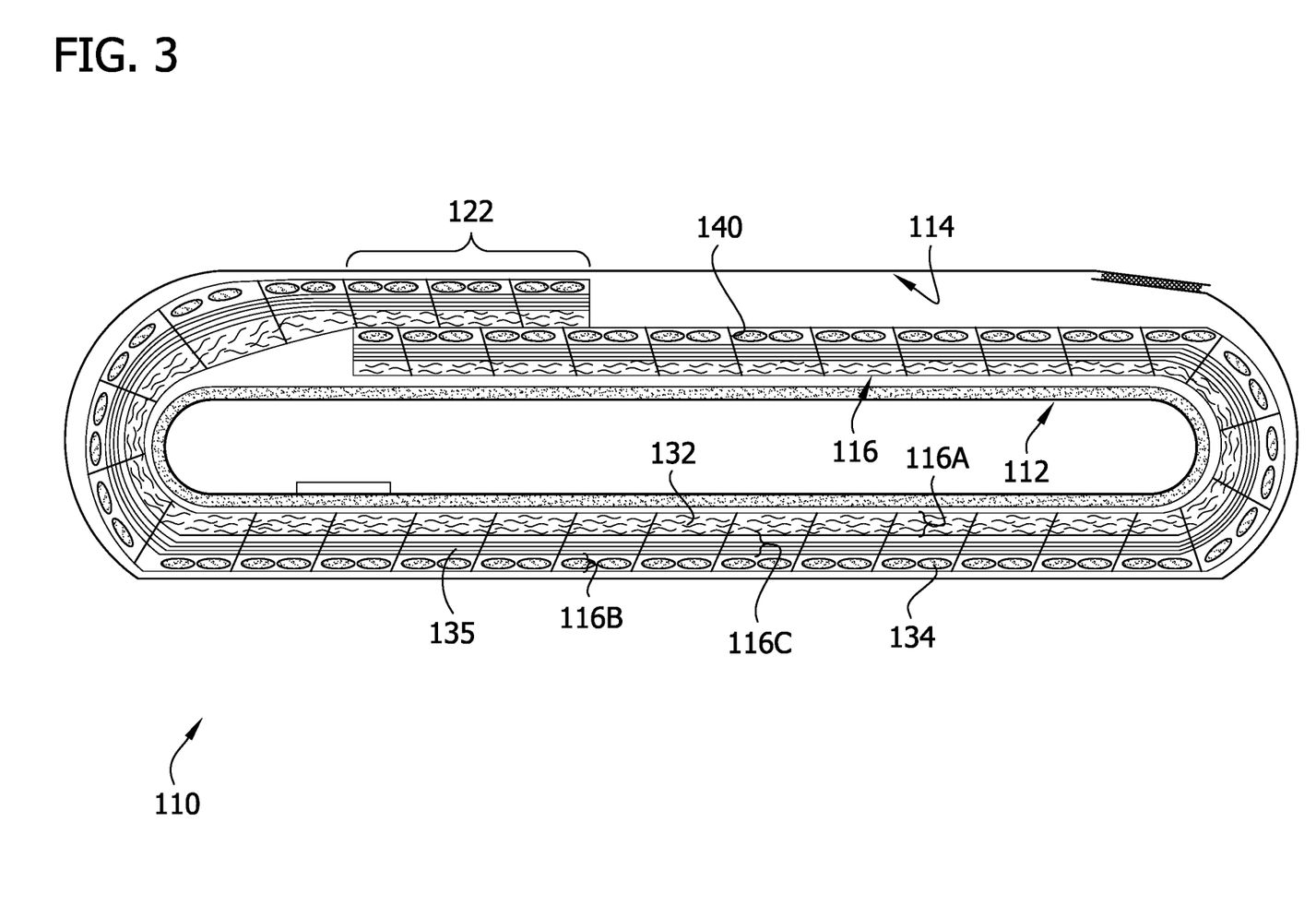
FIG. 3 is a schematic cross section similar to FIG. 2 of another embodiment of a liner.

Referring to FIG. 3, another embodiment of a UV-curable liner is generally indicated at reference number 110. The liner 110 is similar in many respects to the liner 10, and corresponding parts are given corresponding reference numbers, plus 100. The liner 110 can be configured to be manufactured and/or installed using similar methods to those described above with respect to the liner 10. Like the liner 10, the liner 110 comprises an inner portion 112, an outer portion 114, and one or more middle portions 116. The inner portion 112 and the outer portion 114 have the same features as the inner portion 12 and the outer portion 14 described above, but the middle portion 116 is formed from a different type of multilayer composite fabric than the middle portion 16. Thus, like the inner and outer portions 12, 14, the inner and outer portions 112, 114 are configured to encapsulate a UV-curable resin that impregnates the liner 110.

The middle portion 116 includes an inner layer 116A comprising a mat of random oriented chopped fibers 132 that extends along the length and about the circumference of the middle portion. The middle portion 116 also includes an outer layer 116C comprising tows of continuous strengthening fibers 134 that extend along the length of the middle portion and are spaced apart about the circumference of the middle portion. In addition, the middle portion 116 includes a middle layer 116C formed from bundles of continuous strengthening fibers 135 that extend about the circumference of the middle portion and are spaced apart along the length of the middle portion. In certain embodiments, the fibers 132, 134, 136 comprise glass fibers, though other types of fibers can also be used in other embodiments. Unlike the circumferentially oriented fibers 35 of the middle portion 16, the circumferentially oriented fibers 135 are not chopped, and therefore the bundles of circumferentially oriented fibers are not circumferentially stretchable to accommodate radial expansion of the liner 110 during installation. Like the fibers 32, 34, 35 in the strengthening layer 16C, the fibers 132, 134, 135 of the middle portion 116 are secured together by stitching 140.

Accordingly, the middle portion 116 comprises a non-woven biaxial fiber fabric (i.e., the circumferential and longitudinal strengthening layers 116B, 116C) that is stitched to a mat 116A of random oriented chopped fibers 132. The mat 116A of random oriented chopped fibers 132 provides a backing to which the non-woven continuous fibers 134, 135 are secured. Since the middle portion 116 is free of felt, the mat 116A of random oriented chopped fibers 132 also functions as an impregnation layer of the middle portion. And unlike the middle portion 16, the illustrated middle portion 116 is not bonded to the felt of the inner portion 112 by a flame bond or any other joining structure.

The sheet of multilayer composite material forming the middle portion 116 has first and second side margins spaced apart along a width that extends about the circumference of the middle portion. To accommodate radial expansion of the liner even though the bundles of continuous fibers 135 make the material substantially non-stretchable in the circumferential direction, the side margins are overlapped at an overlap portion 122 but are not joined together at the overlap portion. Thus, when the liner 110 expands radially during installation, the overlapped side margins of the material at the overlap portion 122 slide past one another to allow the middle portion 116 to expand. In other embodiments, the side margins of the composite material can be frangibly joined at the overlap portion 122 by joining structure that is configured to break when the liner expands during installation.

Figure 4:
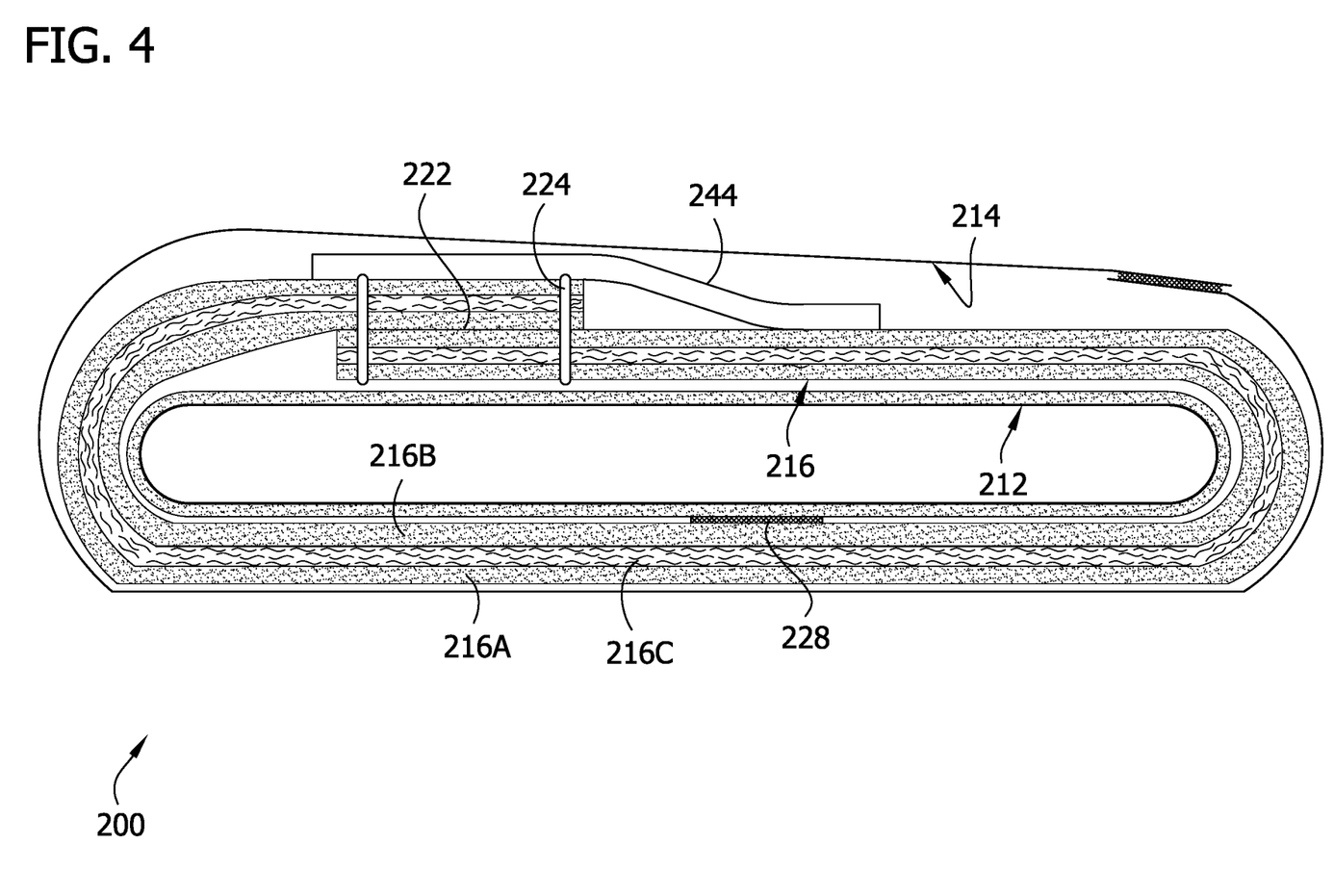
FIG. 4 is a schematic cross section similar to FIG. 2 of another embodiment of a liner.

Referring to FIG. 4, another embodiment of a UV-curable liner is generally indicated at reference number 210. The liner 210 is similar in many respects to the liner 10, and corresponding parts are given corresponding reference numbers, plus 200. The liner 210 can be configured to be manufactured and/or installed using similar methods to those described above with respect to the liner 10. Like the liner 10, the liner 210 comprises an inner portion 212, an outer portion 214, and one or more middle portions 216. The inner portion 212 and the outer portion 214 have the same features as the inner portion 12 and the outer portion 14 described above, but the middle portion 216 is formed from a different type of multilayer composite fabric than the middle portion 16.

In the illustrated embodiment the middle portion 216 comprises inner and outer felt impregnation layers 216A, 216B and a random oriented chopped fiber mat strength layer 216C received between the inner and outer impregnation layers. In one or more embodiments, the felt impregnation layers 216A, 216B are needled to the fibrous strength layer 216C to secure the strength layer in place. Like the middle portion 16, the middle portion 216 is formed from circumferentially stretchable material, and the side margins of a sheet of the material are secured together at an overlap seam 222 by stitching 224. The seam 22 is likewise reinforced by a reinforcing strip 244 that is attached to the outer felt layer 216B. As in the liner 10, the middle portion 216 is flame bonded to the inner portion 212 along a bonding line 228. The inner and outer portions 212, 214 encapsulate a UV-curable resin that impregnates the middle portion 216 and the felt of the inner portion.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A liner for being cured in place in a pipe using electromagnetic radiation having a wavelength in a curing range, the liner having a first end and a second end spaced apart along a length of the liner, the liner comprising:
    an outer portion having an interior and a length extending from the first end to the second end of the liner, the outer portion comprising a fluid-impermeable material formed into a tube extending along the length of the outer portion, the fluid impermeable material being opaque to electromagnetic radiation having a wavelength in the curing range;
    a middle portion located in the interior of the outer portion and having an interior and a length extending from the first end to the second end of the liner, the middle portion comprising an impregnable material formed into a tube extending along the length of the middle portion;
    an inner portion located in the interior of the middle portion and having an interior and a length extending from the first end to the second end of the liner, the inner portion comprising one or more sheets of coated felt having first and second side margins spaced apart along a width that extends about a circumference of the inner portion, the sheets being folded into a tube configuration in which the side margins engage one another and the side margins are joined together at a seam whereby the coated felt formed into a tube extending along the length of the inner portion, the coated felt comprising felt and a fluid-impermeable coating on the felt that defines the interior of the inner portion, the coating being transparent to electromagnetic radiation having a wavelength in the curing range;
    wherein the middle portion comprises an impregnation layer formed by the impregnable material and a strength layer secured to the impregnation layer;
    wherein the strength layer comprises strengthening fibers;
    wherein the strengthening fibers include chopped strands of fiber oriented generally parallel to one another and distributed along the strength layer;
    wherein the middle portion comprises a sheet including the impregnation layer and the strength layer and having first and second side margins extending along the length of the middle portion and a width extending between the first and second side margins;
    wherein the first and second side margins are arranged in overlapped relation to form an overlap portion that has a width and extends along the length of the middle portion, the middle portion being configured so that the middle portion can stretch from a first diameter to a larger second diameter without decreasing the width of the overlap portion.

2. A liner as set forth in claim 1 wherein the impregnation layer comprises a first impregnation layer, the middle portion further comprising a second impregnation layer, the strength layer being received between the first and second impregnation layers.

3. A liner as set forth in claim 2 wherein the strength layer is secured to the first and second impregnation layers by needling.

4. A liner as set forth in claim 2 wherein the first and second impregnation layers comprise felt.

5. A liner as set forth in claim 1 further comprising curable polymer disposed between the tube of fluid-impermeable material and the coating and impregnating the impregnable material and the felt.

6. A liner as set forth in claim 5 wherein the curable polymer is curable by electromagnetic radiation having a wavelength in the curing range.

7. A liner as set forth in claim 1 wherein the strength layer extends along the length of the inner portion.

8. A liner as set forth in claim 1 wherein at least some of the strengthening fibers are arranged to strengthen the liner in a circumferential direction about the tube of impregnable material.

9. A liner as set forth in claim 1 wherein the chopped strands of fiber extend in a circumferential direction about the tube of impregnable material.

10. A liner as set forth in claim 1 wherein the strengthening fibers are non-woven.

11. A liner as set forth in claim 1 wherein the strength layer comprises a first ply comprising chopped strands of fiber oriented generally parallel to one another and distributed along the strength layer and a second ply comprising continuous strands of fiber extending transverse to the chopped strands of fiber.

12. A liner as set forth in claim 1 wherein the strength layer comprises at least one of a mat of random oriented chopped fibers and a non-woven biaxial fiber fabric that extends circumferentially about the tube of impregnable material along the length of the middle portion.

13. A liner as set forth in claim 1 wherein the impregnable material is flame bonded to the felt of the inner portion.

14. A method of repairing a host pipe, the method comprising:
    positioning a liner as set forth in claim 5 inside the host pipe; and
    directing electromagnetic radiation having a wavelength in the curing range outward from a location inside the liner through the impermeable coating to cure the curable polymer whereby the curable polymer cures to form a cured polymer that extends continuously from the impermeable coating to the outer portion through the felt and the impregnable material.

15. A liner for being cured in place in a pipe using electromagnetic radiation having a wavelength in a curing range, the liner having a first end and a second end spaced apart along a length of the liner, the liner comprising:
- an outer portion having an interior and a length extending from the first end to the second end of the liner, the outer portion comprising a fluid-impermeable material formed into a tube extending along the length of the outer portion, the fluid impermeable material being opaque to electromagnetic radiation having a wavelength in the curing range;
- a middle portion located in the interior of the outer portion and having an interior and a length extending from the first end to the second end of the liner, the middle portion comprising an impregnable material formed into a tube extending along the length of the middle portion;
- an inner portion located in the interior of the middle portion and having an interior and a length extending from the first end to the second end of the liner, the inner portion comprising one or more sheets of coated felt having first and second side margins spaced apart along a width that extends about a circumference of the inner portion, the sheets being folded into a tube configuration in which the side margins engage one another and the side margins are joined together at a seam whereby the coated felt formed into a tube extending along the length of the inner portion, the coated felt comprising felt and a fluid-impermeable coating on the felt that defines the interior of the inner portion, the coating being transparent to electromagnetic radiation having a wavelength in the curing range;
- wherein the middle portion comprises an impregnation layer formed by the impregnable material and a strength layer secured to the impregnation layer;
- wherein the strength layer comprises strengthening fibers;
- wherein the strengthening fibers include chopped strands of fiber oriented generally parallel to one another and distributed along the strength layer;
- wherein the chopped strands of fiber extend in a circumferential direction about the tube of impregnable material;
- wherein the middle portion comprises a sheet including the impregnation layer and the strength layer and having first and second side margins extending along the length of the middle portion and a width extending between the first and second side margins;
- wherein the first and second side margins are positioned adjacent one another and are attached to one another at a seam; the seam being constructed to join the first side margin to the second side margin to hold the first side margin from moving in a circumferential direction relative to the second side margin as the liner stretches from a first diameter to a larger second diameter.

* * * * *